US009136925B1

(12) United States Patent
El-Malek et al.

(10) Patent No.: US 9,136,925 B1
(45) Date of Patent: Sep. 15, 2015

(54) TWO-PATH AMPLIFY-AND-FORWARD RELAYING METHOD FOR BANDWIDTH EFFICIENT COGNITIVE RADIOS

(71) Applicant: KING FAHD UNIVERSITY OF PETROLEUM AND MINERALS, Dhahran (SA)

(72) Inventors: Ahmed Hassan Abd El-Malek, Dhahran (SA); Salam Adel Zummo, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/281,847

(22) Filed: May 19, 2014

(51) Int. Cl.
| | | |
|---|---|---|
| H04B 7/04 | (2006.01) |
| H04L 27/34 | (2006.01) |
| H04L 25/03 | (2006.01) |
| H04L 5/16 | (2006.01) |

(52) U.S. Cl.
CPC ............... *H04B 7/0456* (2013.01); *H04L 5/16* (2013.01); *H04L 25/03305* (2013.01); *H04L 27/34* (2013.01)

(58) Field of Classification Search
CPC .. H04B 7/0465; H04B 7/0478; H04B 7/2606; H04B 7/026; H04B 7/1555; H04B 7/0417; H04B 7/0452; H04B 7/0626; H04B 7/0632; H04B 7/0654; H04B 7/0663; H04B 7/0669; H04B 7/0673; H04B 7/2656; H04B 7/0456; H04L 27/34; H04L 25/03305; H04L 5/16
See application file for complete search history.

(56) References Cited

U.S. PATENT DOCUMENTS

| | | | | |
|---|---|---|---|---|
| 8,326,309 | B2 * | 12/2012 | Mody et al. | 455/452.1 |
| 8,811,503 | B2 * | 8/2014 | Kim et al. | 375/260 |
| 8,964,653 | B2 * | 2/2015 | Viswanath | 370/329 |
| 2005/0281321 | A1 * | 12/2005 | Bergstrom et al. | 375/144 |
| 2009/0170444 | A1 * | 7/2009 | Retnasothie et al. | 455/73 |
| 2010/0069010 | A1 * | 3/2010 | Karakayali et al. | 455/63.1 |
| 2010/0110968 | A1 * | 5/2010 | Lee et al. | 370/315 |
| 2011/0296268 | A1 * | 12/2011 | Ao et al. | 714/748 |
| 2012/0106340 | A1 * | 5/2012 | Hoymann et al. | 370/235 |
| 2012/0238220 | A1 | 9/2012 | Du et al. | |
| 2012/0289272 | A1 | 11/2012 | Wang et al. | |

(Continued)

OTHER PUBLICATIONS

Performance Bounds for Two Way Amplify and Forward Relaying based on Relay Path Selection; Hwang et al.; IEEE 2009; 5 pages.*
On the Diversity Order of AF Cooperative Systems with Inter Relay Interference Cancellation; Wicaksana et al.; 5 Pages; IEEE 2008.*
Joint Source-Relay Optimization for Two Path MIMO AF Relay System; Chen et al.; 5 Pages; IEEE 2012.*

(Continued)

*Primary Examiner* — Hirdepal Singh
(74) *Attorney, Agent, or Firm* — Richard C. Litman (57) ABSTRACT

The two-path amplify-and-forward relaying method for bandwidth efficient cognitive radios utilizes a primary user (PU) transmitter cooperating with a secondary user (SU) transmitter and receiver to relay PU data to the PU receiver. The present algorithm makes use of the inter-relay interference (IRI) between the two relay nodes to transmit SU data and cancel this IRI at the PU receiver node. The SU transmission power and the relaying amplifying factors are optimized to minimize the probability of error. Lagrangian multiplier method is used to obtain the optimal solution for the problem. Simulation results show that the present algorithm outperforms the single data transmission and gets closer to the performance of multiple input multiple output (MIMO) system of diversity 3 for PU network and 2 for SU network when a maximum likelihood decoder (MLD) is used.

14 Claims, 3 Drawing Sheets

(a) 1st time slot (b) 2nd time slot

(56) References Cited

U.S. PATENT DOCUMENTS

| | | |
|---|---|---|
| 2013/0039265 A1* | 2/2013 | Shin et al. .................... 370/326 |
| 2013/0052942 A1* | 2/2013 | Maddah-Ali .................... 455/9 |
| 2013/0079045 A1 | 3/2013 | Ma et al. |
| 2013/0114500 A1 | 5/2013 | Liu et al. |
| 2013/0294356 A1* | 11/2013 | Bala et al. .................... 370/329 |
| 2014/0029516 A1 | 1/2014 | Heo et al. |
| 2015/0043541 A1* | 2/2015 | Blankenship et al. ........ 370/336 |

OTHER PUBLICATIONS

El Shafie, Ahmed, Khattab, Tamer, "Maximum Throughput for a Cognitive Radio Multi-Antenna User with Multiple Primary Users," Wireless Intelligent Networks Center (WINC), Nile University, Giza, Egypt, Electrical Engineering, Qatar University, Doha, Qatar, Jan. 9, 2014.

S. Grant and J. Cavers, "Performance enhancement through joint detection of cochannel signals using diversity arrays," Communications, IEEE Transactions on, vol. 46, No. 8, pp. 1038-1049, 1998.

* cited by examiner

TWO-PATH AMPLIFY-AND-FORWARD RELAYING METHOD FOR BANDWIDTH EFFICIENT COGNITIVE RADIOS

BACKGROUND OF THE INVENTION

1. Field of the Invention

The present invention relates to telecommunications channel interference suppression, and particularly to a two-path amplify-and-forward relaying method for bandwidth efficient cognitive radios which provides makes use of the inter-relay interference (IRI) between two relay nodes to transmit secondary user (SU) data and cancel this IRI at the primary user (PU) receiver node.

2. Description of the Related Art

A two-path relay scheme has recently been considered as an attractive wireless communication scheme to improve the spectral efficiency and performance of half duplex cooperative networks. The two-path relay scheme consists of a source node S, a destination D and two relay nodes $R_A$ and $R_B$. Transmission time slots are divided between the two relays, i.e. while one relay receives the source data the other one relays the previous data received during the previous time slot. Two-path relay scheme needs (N+1) time slots to transmit N data frames from S to D. In order to increase bandwidth efficiency of N/(N+1) and make it close to one, N should be sufficiently large.

In the related art, the two-path relay scheme was used only to relay data from node S to node D using one of the two famous relaying protocols amplify-and-forward (AF) or decode-and forward (DF). Due to the simultaneous transmission from S to relay nodes $R_A$ and $R_B$, inter-relay interference (IRI) problem appears and causes system performance degradation. IRI is a problem that remains with this relay scheme.

Thus, a two-path amplify-and-forward relaying method for bandwidth efficient cognitive radiossolving the aforementioned problems is desired.

SUMMARY OF THE INVENTION

The two-path amplify-and-forward relaying method for bandwidth efficient cognitive radios utilizes a primary user (PU) transmitter cooperating with a secondary user (SU) transmitter and receiver to relay PU data to the PU receiver. The present algorithm makes use of the inter-relay interference (IRI) between the two relay nodes to transmit SU data and cancel this IRI at the PU receiver node. The SU transmission power and the relaying amplifying factors are optimized to minimize the probability of error.

Lagrangian multiplier method is used to obtain the optimal solution for the problem. Simulation results show that the present algorithm outperforms the single data transmission and gets closer to the performance of multiple input multiple output (MIMO) system of diversity 3 for PU network and 2 for SU network when a maximum likelihood decoder (MLD) is used.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The two-path amplify-and-forward relaying method for bandwidth efficient cognitive radios utilizes a primary user (PU) transmitter cooperating with a secondary user (SU) transmitter and receiver to relay PU data to the PU receiver. The present algorithm makes use of the inter-relay interference (IRI) between the two relay nodes to transmit SU data and cancel this IRI at the PU receiver node. The main idea is to control the SU transmission power and the amplifying factors of the two relays $R_A$ and $R_B$ in such a way that D and $R_A$ can extract their data with minimum probability of error. The SU transmission power and the relaying amplifying factors are optimized to minimize the probability of error.

Lagrangian multiplier method is used to obtain the optimal solution for the problem. Simulation results show that the present algorithm outperforms the single data transmission and gets closer to the performance of multiple input multiple output (MIMO) system of diversity 2 when a maximum likelihood decoder (MLD) is used.

Figure 1A:
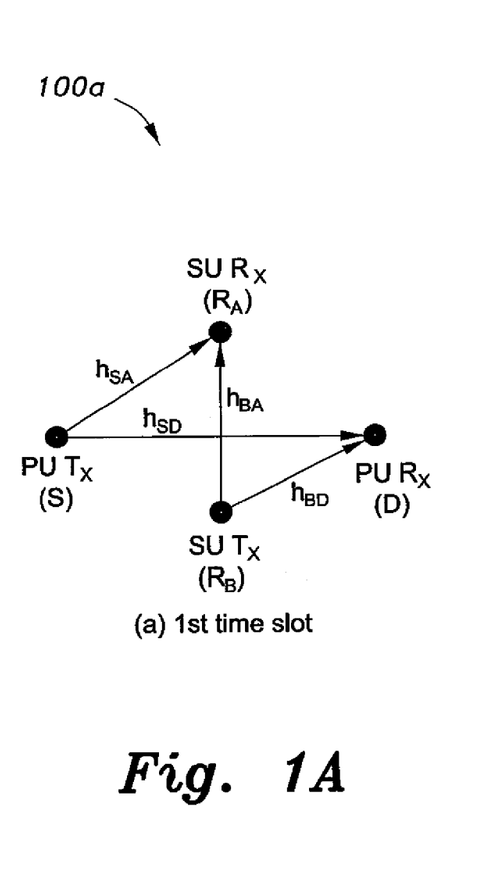
FIG. 1A is a pictorial diagram of a two-path amplify-and-forward relaying method at a first time slot according to the present invention.
Figure 1B:
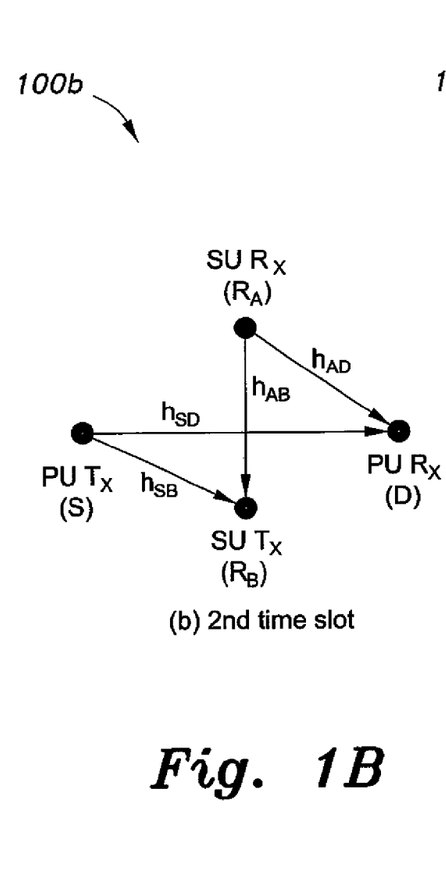
FIG. 1B is a pictorial diagram of the two-path amplify-and-forward relaying method at a second time slot according to the present invention.
Figure 1C:
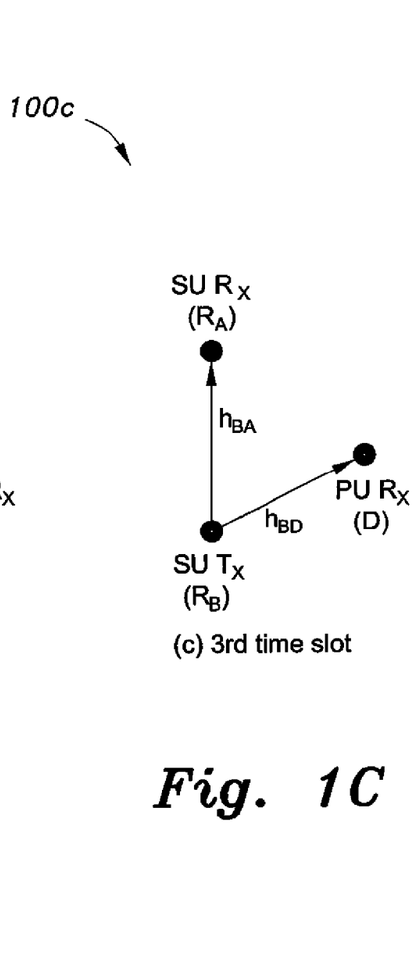
FIG. 1C is a pictorial diagram of the two-path amplify-and-forward relaying method at a third time slot according to the present invention.

As shown in FIGS. 1A through 1C, during the first time slot 100a, S and $R_B$ transmit their data at the same time which causes an interference at D and $R_A$. During the second time slot 100b, S transmits its data to D and $R_B$ while $R_A$ applies AF protocol to the previously received data and transmits it to D and $R_B$ which causes an interference again. In the third time slot 100c and assuming the channel state information (CSI) is known for all the receiver nodes, $R_B$ will subtract the amplified interfered version of its SU data and add another clean copy of it to the received signal before forwarding it to the destination node D. The channel gain between S and D is denoted by $h_{SD}$, and the channel gains between S and $R_A$ and $R_B$ are denoted by $h_{SA}$ and $h_{SB}$, respectively. The channel gains between $R_A$ and $R_B$ are $h_{AB}$ and $h_{BA}$. The two relays nodes $R_A$ and $R_B$ have channel gains to the destination node given by $h_{AD}$ and $h_{BD}$, respectively. For notational simplicity, all the channel gains are assumed independent and identically distributed (i.i.d) flat Rayleigh fading channels. Amplify and Forward (AF) protocol is applied by both relays in this scenario since it is less complex and more flexible in handling IRI than DF protocol.

In the first time slot, S transmits the algebraic subtraction of two successive modulated signals denoted by $s_1$ and $s_2$ with total power $P_s$. At the same time $R_B$ transmits its data $b_1$ with power $P_B$ which interferes with PU data at $R_A$ and D. Then the received signal at D and $R_A$ in the 1$^{st}$ time slot are respectively given by $$y_D^{(1)} = \sqrt{\frac{P_s}{2}} h_{SD}(s_1 - s_2) + \sqrt{P_B} h_{BD} b_1 + w_D^{(1)} \tag{1}$$

$$y_A^{(1)} = \sqrt{\frac{P_s}{2}} h_{SA}(s_1 - s_2) + \sqrt{P_B} h_{BA} b_1 + w_A^{(1)} \tag{2}$$

where $w_D$ and $w_A$ are AWGN samples with zero mean and variance $\sigma^2$. For the second time slot, S transmits the second symbol only $s_2$ with total power $P_s$ to $R_B$ and D. While $R_A$ transmits the previous received data after applying AF protocol. The second time slot received signals at D and $R_B$ are respectively given by $$y_D^{(2)} = \sqrt{P_s} h_{SD} s_2 + h_{AD} x_A^{(2)} + w_D^{(2)} \tag{3}$$

$$y_B^{(2)} = \sqrt{P_s} h_{SB} s_2 + h_{AB} x_A^{(2)} + w_B^{(2)} \tag{4}$$

where $w_B$ is AWGN samples with zero mean and variance $\sigma^2$ and $x_A^{(2)}$ is the amplified received signal at $R_A$ such that $x_A^{(2)} = \beta_A y_A^{(1)}$. Assuming $R_A$ retransmits the data with power $P_{RA} = \lambda_A P_s$, then $\beta_A$ which is the normalized amplification factor given by $$\beta_A^2 = \frac{P_{RA}}{E|y_A^{(1)}|^2} = \frac{\lambda_A P_s}{v_S^2 P_s + v_R^2 P_B + \sigma^2}.$$

During the third time slot, S is idle while $R_B$ transmits the received signal after removing the interfered SU data $b_1$ and adding a new fresh version of it but with negative sign, i.e., $-b_1$ with power $P_B$. Under the assumption of knowing CSI by all relay nodes and destination, the received signal at D and $R_A$ in the third time slot are respectively given by $$y_D^{(3)} = h_{BD} x_B^{(3)} - \sqrt{P_B} h_{BD} b_1 + w_D^{(3)} \tag{5}$$

$$y_A^{(3)} = h_{BA} x_B^{(3)} - \sqrt{P_B} h_{BA} b_1 + w_A^{(3)} \tag{6}$$

where $x_B^{(3)}$ is the amplified received signal at $R_B$ after the subtraction of the SU data such that $x_B^{(3)} = \beta_B (y_B^{(2)} - b'_1)$, where $b'_1$ is the modified image of SU data $b_1$ such that $b'_1 = \beta_A h_{AB} h_{BA} b_1$. Assuming that $R_B$ transmits the received signal by power $P_{RB} = \lambda_B P_s$, then the normalized amplifying factor is given by $$\beta_B^2 = \frac{P_{RB}}{E|y_B^{(2)}|^2} = \frac{\lambda_B P_s}{v_S^2 P_s + \lambda_A v_R^2 P_B + \sigma^2}.$$

From the previous equations and the existence of two receivers in this model the matrix expression for the 3-slots system at D can be written as $$y_D = H_D x_S + w'_D, \tag{7}$$

where $y_D = [y_D^{(1)}, y_D^{(2)}, y_D^{(3)}]^T$, $x_S = [\sqrt{P_s} s_1, \sqrt{P_s} s_2, \sqrt{P_B} b_1]^T$ $$H_D = \begin{bmatrix} \sqrt{\frac{1}{2}} h_{SD} & -\sqrt{\frac{1}{2}} h_{SD} & h_{BD} \\ \sqrt{\frac{1}{2}} \alpha_A & h_{SD} - \sqrt{\frac{1}{2}} \alpha_A & \beta_A h_{AD} h_{BA} \\ \sqrt{\frac{1}{2}} \beta_B h_{BD} \alpha'_A & \beta_B h_{BD}\left(h_{SD} - \sqrt{\frac{1}{2}} \alpha'_A\right) & -h_{BD} \end{bmatrix} \tag{8}$$

and the noise vector at D is given by $$w'_D = \begin{bmatrix} w_D^{(1)} \\ w_D^{(2)} + \beta_A h_{AD} w_A^{(1)} \\ w_D^{(3)} + h_{BD} \beta_B (w_B^{(2)} + h_{AB} \beta_A w_A^{(1)}) \end{bmatrix}, \tag{9}$$

where $\alpha_A = \beta_A h_{AD} h_{SA}$ and $\alpha'_A + \beta_A h_{AB} h_{SA}$. For the secondary system, the received signals of the receiver $R_A$ can be expressed as $$y_A = H_A x_S + w'_A \tag{10}$$

where $y_A = [y_A^{(1)}, y_A^{(3)}]^T$, $x_S = [\sqrt{P_s} s_1, \sqrt{P_s} s_2, \sqrt{P_B} b_1]^T$ $$H_A = \begin{bmatrix} \sqrt{\frac{1}{2}} h_{SA} & -\sqrt{\frac{1}{2}} h_{SA} & h_{BA} \\ \sqrt{\frac{1}{2}} \beta_B h_{BA} \alpha'_A & \beta_B h_{BA}\left(h_{SD} - \sqrt{\frac{1}{2}} \alpha'_A\right) & -h_{BA} \end{bmatrix} \tag{11}$$

and the noise vector at $R_A$ is given by $$w'_A = [w_A^{(1)}, w_A^{(2)} + h_{BA} \beta_B (w_B^{(2)} + h_{AB} \beta_A w_A^{(1)})]^T. \tag{12}$$

The additive noise terms at all the system terminals are assumed to be statistically independent and identically distributed (i.i.d.) and zero-mean Gaussian distribution. In the case that there is no direct link S and D or the direct link is too weak, the same equations and expressions are valid with setting $h_{SD} = 0$.

With respect to bit error rate analysis for maximum likelihood detection, since different images of the data symbols are sent during different time slots creating a virtual MIMO network, maximum likelihood detector (MLD) has been used by the PU and SU to detect their data. MLD is the optimal detector in terms of minimizing the probability of error. The MLD estimates the symbol vector $\hat{x}_s$ that gives the minimum Euclidean distance metric at D and $R_A$, independently. The Euclidean distance metric can be expressed for D and $R_A$, respectively as $$\mu_D = \|y_D - H_D x_S\|^2 = \sum_{l=1}^{L=3} |y_D^{(l)} - h_D^{(l)} x_S|^2 \tag{13}$$

-continued $$\mu_A = \|y_A - H_A x_S\|^2 = \sum_{l=1}^{L=2} |y_A^{(l)} - h_A^{(l)} x_S|^2, \quad (14)$$

where $h_D^{(l)}$ and $h_A^{(l)}$ denote the l-th row of $H_D$ and $H_A$, respectively. The increasing of MLD computational complexity depends on the number of points in the signal constellation and the number of transmitters which are 3 nodes in this system; namely S, $R_A$ and $R_B$. The pairwise-error probability is defined as the probability that the MLD chooses the erroneous data vector $c_i = (c_{i1}, c_{i2}, c_{i3})$ instead of the transmitted data vector $c_j = (c_{j1}, c_{j2}, c_{j3})$, where the data symbols $c_{im}$ and $c_{jm}$ are for the m-th user. The data symbols are drawn from a PSK constellation of size Q and unit radius. The resulting pairwise-error probability is $$P_{2_{ij}} = \frac{1}{(1-r_{ij})^{2L-1}} \sum_{k=0}^{L-1} \binom{2L-1}{k} (-r_{ij})^k, \quad (15)$$

where $$r_{ij} = \frac{\lambda_{ij1}}{\lambda_{ij2}}$$

where is the ratio between the two nonzero eigenvalues of matrix $RF_{ij}$ where R is a covariance matrix based on error signals and $F_{ij}$ is a hermitian matrix based on the transmitted data vectors, as defined in S. Grant and J. Cavers, "Further analytical results on the joint detection of cochannel signals using diversity arrays," Communications, IEEE Transactions on, vol. 48, no. 11, pp. 1788-1792, 2000 which is incorporated by reference in its entirety herein. The union bound on the probability of symbol error for m users, given that $c_j$ is transmitted, is given by the sum of the pairwise error probabilities over the subset of vectors in $c_i$ that differ in their m-th position from $c_j$. Assuming equi-probable transmitted data vectors and noting that the probability of error does not depend on which data vector is actually transmitted, we have $$P_{s_m} \leq \Sigma_i P(D_{ij} < 0 | c_j), \quad (16)$$

where $D_{ij}$ is the difference between the two metrics of $c_i$ and $c_j$, and i indexes the subset of vectors in $c_i$ which differ in their m-th position from $c_j$. The pairwise error probability is determined in the following manner. A full derivation for joint detection of co-channel signals using diversity arrays is known in the art. Assuming perfect CSI and using the same definition of R and $F_{ij}$ matrices known in the prior art, the two sided Laplace transform of the probability density function (pdf) of $d_{ijl}$ is given as $$\phi_{d_{ijl}} = \frac{1}{\det(1 + 2sRF_{ij})},$$

where $d_{ijl}$ is the metric of the l-th diversity branch. Due to independent fading channels between the diversity branches all the $d_{ijl}$'s are independent. As a result, the two sided Laplace transform of the pdf of $D_{ij} = \Sigma_l d_{ijl}$ is simply the product $\phi_{D_{ij}}(s) = \Pi_l \phi_{d_{ijl}}(s)$ and since R is independent of l then $\phi_{D_{ij}}(s) = [\det(I+2sRF_{ij})^{-L}]$. But since our problem here is quite different than related art formulations because of AF relay protocol the noise floor changes with each transmission then a different R matrix is formulated each time. Since there are L transmission time slots then $$\phi_{D_{ij}}(s) = \prod_{l=1}^{L} \frac{1}{\det(I + 2sR_l F_{ij})}. \quad (17)$$

The previous equation can be expressed in terms of the non-zero eigenvalues of the covariance matrix R such as $$\phi_{D_{ij}}(s) = \prod_{l=1}^{L} \frac{p_{ijl1} p_{ijl2}}{(s - p_{ijl1})(s - p_{ijl2})}, \quad (18)$$

where $$p_{ijl1} = \frac{1}{\lambda_{ijl1}}$$

and $$p_{ijl2} = \frac{1}{\lambda_{ijl2}}$$

as $\lambda_{ijl1}$ and $\lambda_{ijl2}$ are the two non-zero eigenvalues of $R_l$. Since the inverse Laplace transform of the product is a convolution and let $$r_{sm,ijl} = \frac{-p_{ijl2}}{p_{ijl1}}$$

so the pairwise error probability of l-th branch can be given as in prior art.

$$P_{sm,ijl} = \frac{1}{(1 + r_{sm,ijl})} \quad (19)$$

$$r_{sm,ijl} = a_{sm,ijl} \Gamma_{sm,jl} \sqrt{(a_{sm,ijl} \Gamma_{sm,ijl})^2 + 2(a_{sm,ijl} \Gamma_{sm,jl})} + 1 \quad (20)$$

where $$a_{sm,ijl} = \frac{\|d_i - d_j x_S\|^2}{2E_{sl}}$$

and $\Gamma_{sm,jl}$ is the average symbol SNR per diversity branch. Then the union bound on the probability of error for the m-th user is given by $$P_{s_m} \leq \sum_i \prod_{l=1}^{L} \frac{1}{(1 + r_{sm,ijl})} \quad (21)$$

where i includes all the indexes of vectors in $c_i$ that differ in their m-th position from the transmitted vector $c_j$.

With respect to power allocation for interference cancellation in order to minimize the probability of error for the PU and SU systems exact and asymptotic bit error rate (BER) expressions for MLD are used to obtained the optimal and sub-optimal solutions, respectively.

For Optimal Power Allocation, the inventive method removes the IRI at node D to achieve minimum probability of error for the primary system. The key of this algorithm is to control the SU transmission power $P_B$ of the two relays. Also, the algorithm controls the amplifying factors $\beta_A$ and $\beta_B$ of the two relays. To derive the optimal power allocation scheme, the overall BER is expressed in terms of $(P_B)$, $\lambda_A$ and $\lambda_B$. The goal is to find the values of those parameters which minimize the overall BER. The BER is a function of the SNR and then the BER for a given channel state may be expressed as Pb(e)= $f(P_B, \lambda_A, \lambda_B)$ where f(.) is a function determined by a specific modulation scheme and detection method. In this problem, f(.) equals the probability of error given in equation (21). Thus an optimization problem has been formulated in which the target function can be minimizing the PU BER only or minimizing the total sum BER of the PU and SU as characterized by the relation, minimize $f(P_B, \lambda_A, \lambda_B)$ subject to $P_B + \lambda_B P_s \leq P_B$ and $2P_B + \lambda_A P_s + \lambda_B P_s \leq P_{total}$ (22)

To find the optimal values for $P_B$, $\lambda_A$, $\lambda_B$, a Lagrangian multiplier method with the two power constraints in equation (22) is used. The Lagrangian function J(.) can be expressed as $J(\gamma)=(P_B(i); \lambda_A(i), \lambda_B(i))=f(P_B(i), \lambda_A(i), \lambda_B(i)))+\Lambda_1$
$(P_B+\lambda_B P_s-\overline{P}_B)+\Lambda_2(2P_B+\lambda_A P_s+\lambda_B P_s-\overline{P}_{total})$ (23)

where $\Lambda_1$ and $\Lambda_2$ denote the Lagrangian multipliers. Since the BER function is difficult to find a closed form solution, steepest decent algorithm is used as an adaptive algorithm to find the optimal solution in an iterative manner.

Regarding Suboptimal Power Allocation a simpler approach for the power allocation problem is to employ the asymptotic union bound of MLD probability of error instead of the exact one which reduces the complexity of the optimization problem and gives the asymptotic BER of the system. For high SNR, the expression in equation (21) can be reduced to $$P_{s_{m,asym}} \leq \sum_i \prod_{l=1}^{L} r_{sm,ijl}^{-1}.$$ (24)

Figure 2:
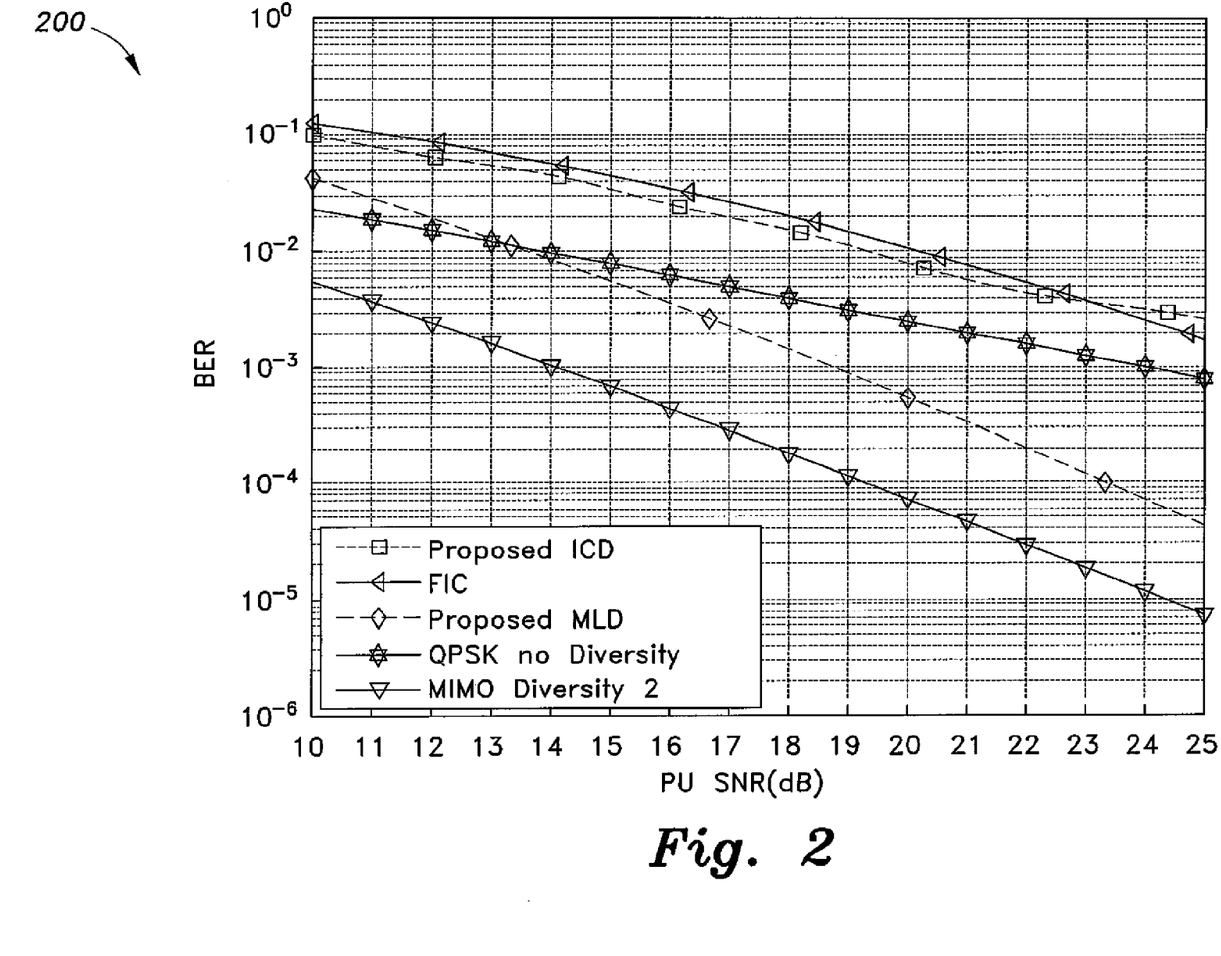
FIG. 2 is a BER performance comparison plot between FIC algorithm and the present algorithm (ICD/MLD) in Rayleigh fading channel according to the present invention.
Figure 3:
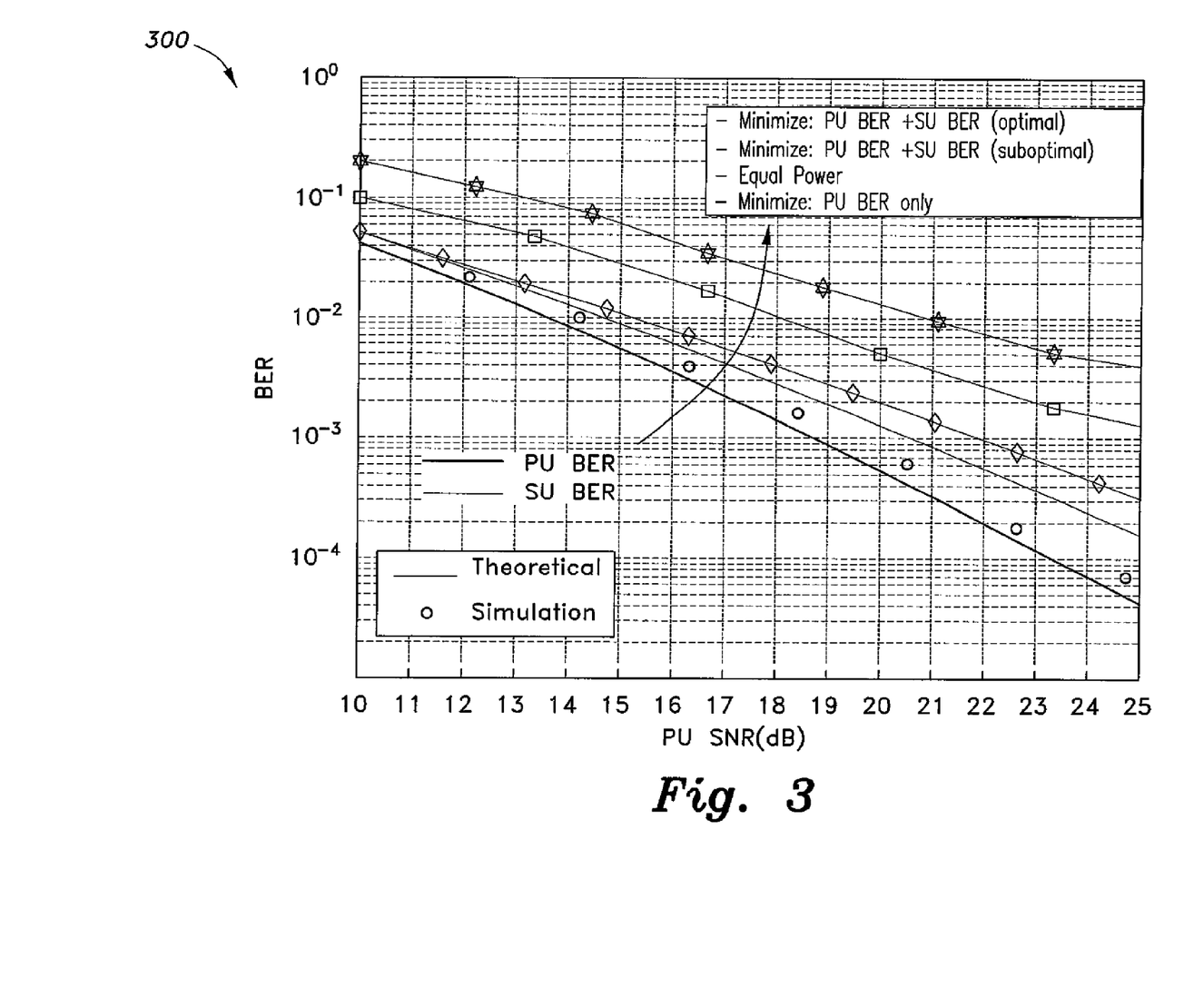
FIG. 3 is a BER performance plot of PU and SU with different power allocation Criteria according to the present invention.

The Lagrangian algorithm expressed above is followed to obtain suboptimal values for transmission powers of different nodes. Numerical examples are given to verify the present algorithm. In the simulation, there are 15,000 data frames transmitted in total with 3 symbols for each frame, 2 symbols for PU and 1 symbol for SU. The channels between all nodes are (i.i.d.) channels. The simulation results obtained for different detection methods such as inverse channel detector (ICD) and MLD. Lagrangian multiplier algorithm has been used to minimize BER of PU only and also to minimize the total sum of BER of PU and SU. Since the proposed algorithm sends 3 data symbols in 3 time slots with bandwidth efficiency equals 1, the simulation of FIC algorithm has been performed with 64 symbols per frame to result in almost unity BW efficiency. Plot 200 of FIG. 2 shows a comparison between different transmissions schemes that the PU can use to transmit its data over a Rayleigh fading channel. The modulation scheme used is quadrature amplitude (QPSK) modulation. It is clear that the proposed algorithm with MLD detector outperforms the cooperative transmission with FIC algorithm known by artisans having ordinary skill. The proposed algorithm with ICD detector gives the worst performance because it depends on linearity operations with low computational complexity. Also it compares the BER performance between the aforementioned FIC algorithm and the proposed algorithm with ICD/MLD detection over Rayleigh fading channel with the effect of path loss and lognormal shadowing. It is clear that the proposed algorithm with MLD detector outperforms the FTC algorithm. FIG. 3 introduces the effect of different optimization target function. Lagrangian multiplier has been used to optimize PU BER only and to minimize the sum of PU and SU BERs to obtain optimal and sub-optimal solutions. Lagrangian multiplier method with MLD detector exact and asymptotic BER expressions have been used over a Rayleigh fading channel and the result is that the PU performance does not change while there is a huge improvement in the SU performance. Plot 300 of FIG. 3 shows a comparison between the SU performance under optimal and suboptimal solutions verses equal power allocation schemes.

The two relay nodes in the two-path AF relay scheme are considered as a complete secondary system as well as they serve as relay nodes for the primary system. The goal is to fully utilize the channel bandwidth by using the inter-relay interference between the two relays to transmit the secondary data in between. Optimization problem is formulated to minimize the PU BER in terms of SU transmission power and the two amplifying factors of the relays. Lagrangian multiplier method with steepest decent algorithm help is used to obtain the optimal solution. Results show that the PU BER performance outperforms the performance of single transmission which encourages the PU system to cooperate with the SU system. Although the different power allocation schemes do not change the performance of PU system but they have a great impact on the SU system where the optimal power allocation scheme outperforms all other schemes.

It is to be understood that the present invention is not limited to the embodiments described above, but encompasses any and all embodiments within the scope of the following claims.

We claim:

1. A two-path amplify-and-forward relaying method for a bandwidth efficient cognitive radio, comprising the steps of:

transmitting PU data from a primary user (PU) transmitter S to a primary user (PU) receiver D in cooperation with a first secondary user (SU) relay $R_A$ (SU receiver) and a second secondary user relay $R_B$ (SU transmitter), the PU data transmission being divided into first, second, and third timeslots;

in the first timeslot transmitting the algebraic subtraction of two successive modulated signals, $s_1$ and $s_2$ with total power $P_s$ from S to the first secondary user relay $R_A$ and the PU receiver D;

in the first timeslot transmitting data $b_1$ with power $P_B$ from $R_B$ to $R_A$ and the PU receiver D, the data $b_1$ interfering with PU data at $R_A$ and D, the received signal at D and $R_A$ in the 1st time slot being characterized by the relations, $$y_D^{(1)} = \sqrt{\frac{P_s}{2}} h_{SD}(s_1 - s_2) + \sqrt{P_B} h_{BD} b_1 + w_D^{(1)},$$

and $$y_A^{(1)} = \sqrt{\frac{P_s}{2}} h_{SA}(s_1 - s_2) + \sqrt{P_B} h_{BA} b_1 + w_A^{(1)};$$

in the second timeslot transmitting the second symbol only $s_2$ with total power $P_s$ to $R_B$ and D from S, while $R_A$ transmits the previous received data after applying amplify-and-forward (AF) protocol, the second time slot received signals at D and at $R_B$ being characterized by the relations, $$y_D^{(2)} = \sqrt{P_s} h_{SD} s_2 + h_{AD} x_A^{(2)} + w_D^{(2)}$$

and $$y_B^{(2)} = \sqrt{P_s} h_{SB} s_2 + h_{AB} x_A^{(2)} + w_B^{(2)},$$

where $w_B$ and $w_A$ are AWGN samples with zero mean and variance $\sigma^2$ and $x_A^{(2)}$ is the amplified received signal at $R_A$ such that $x_A^{(2)} = \beta_A y_A^{(1)}$;

in the third timeslot transmitting from $R_B$ to $R_A$ and D the received signal after removing the interfered SU data $b_1$ and adding a new fresh version of it but with negative sign $-b_1$ with power $P_B$, the received signal at D and $R_A$ in the third time slot being characterized by the relations, $$y_D^{(3)} = h_{BD} x_B^{(3)} - \sqrt{P_B} h_{BD} b_1 + w_D^{(3)},$$

and $$y_A^{(3)} = h_{BA} x_B^{(3)} - \sqrt{P_B} h_{BA} b_1 + w_A^{(3)},$$

where $x_B^{(3)}$ is the amplified received signal at $R_B$ after the subtraction of the SU data such that $x_B^{(3)} = \beta_B(y_B^{(2)} - b'_1)$, where $b'_1$ is the modified image of SU data $b_1$ such that $b'_1 = \beta_A h_{AB} h_{BA} b_1$;

using a maximum likelihood detector (MLD) in the PU and SU to detect the PU and SU data, wherein the MLD estimates a symbol vector $\hat{x}_s$ that gives the minimum Euclidean distance metric at D and $R_A$, independently, the Euclidean distance metric for D and $R_A$ being characterized by the relations, $$\mu_D = \|y_D - H_D x_S\|^2 = \sum_{l=1}^{L=3} |y_D^{(l)} - h_D^{(l)} x_S|^2,$$

and $$\mu_A = \|y_A - H_A x_S\|^2 = \sum_{l=1}^{L=2} |y_A^{(l)} - h_A^{(l)} x_S|^2,$$

where $h_D^{(l)}$ and $h_A^{(l)}$ denote the l-th row of $H_D$ and $H_A$, respectively, a pairwise-error probability being defined as the probability that the MLD chooses the erroneous data vector $c_i = (c_{i1}, c_{i2}, c_{i3})$ instead of the transmitted data vector $c_j = (c_{j1}, c_{j2}, c_{j3})$, where the data symbols $c_{im}$ and $c_{jm}$ are for the m-th user; and controlling SU transmission power and amplifying factors of the two relays $R_A$ and $R_B$ based on the pairwise-error probability.

2. The two-path amplify-and-forward relaying method for a bandwidth efficient cognitive radio according to claim 1, further comprising the step of using a Lagrangian multiplier method to minimize the pairwise-error probability, which is characterized by the relations, $$P_{2ij} = \frac{1}{(1-r_{ij})^{2L-1}} \sum_{k=0}^{L-1} \binom{2L-1}{k}(-r_{ij})^k,$$

and $$P_{s_m} \leq \Sigma_i P(D_{ij} < 0 | c_j),$$

where $$r_{ij} = \frac{\lambda_{ij1}}{\lambda_{ij2}}$$

is the ratio between the two nonzero eigenvalues of a matrix $RF_{ij}$, R being a covariance matrix based on error signals, $F_{ij}$ being a hermitian matrix based on the transmitted data vectors and $D_{ij}$ is the difference between the two metrics of $c_i$ and $c_j$, and i indexes the subset of vectors in $c_i$ which differ in their m-th position from $c_j$.

3. The two-path amplify-and-forward relaying method for a bandwidth efficient cognitive radio according to claim 2, further comprising the step of computing a formulation of a two sided Laplace transform of a probability density function (pdf) of $d_{ijl}$, the formulation being characterized by the relation, $$\phi_{D_{ij}}(s) = \prod_{l=1}^{L} \frac{p_{ijl1} p_{ijl2}}{(s - p_{ijl1})(s - p_{ijl2})},$$

where $$p_{ijl1} = \frac{1}{\lambda_{ijl1}}$$

and $$p_{ijl2} = \frac{1}{\lambda_{ijl2}}$$

as $\lambda_{ijl1}$ and $\lambda_{ijl2}$ are the two non-zero eigenvalues of $R_l$, the inverse Laplace transform of the product being a convolution where $$r_{sm,ijl} = \frac{-p_{ijl2}}{p_{ijl1}},$$

the pairwise error probability of an l-th branch being characterized by the relation, $$P_{sm,ijl} = \frac{1}{(1 + r_{sm,ijl})},$$

where $$r_{sm,ijl} = \alpha_{sm,ijl}\Gamma_{sm,jl}\sqrt{(\alpha_{sm,ijl}\Gamma_{sm,jl})^2 + 2(\alpha_{sm,ijl}\Gamma_{sm,jl})} + 1$$

and where $$a_{sm,ijl} = \frac{\|d_i - d_j x_S\|^2}{2E_{sl}},$$

and $\Gamma_{sm,jl}$ is the average symbol signal-to-noise-ratio (SNR) per diversity branch.

4. The two-path amplify-and-forward relaying method for a bandwidth efficient cognitive radio according to claim 3, further comprising the step of computing a formulation of a union bound on the probability of error for the m-th user, the formulation being characterized by the relation selected from the group consisting of, $$P_{s_m} \leq \sum_i \prod_{l=1}^{L} \frac{1}{(1 + r_{sm,ijl})}, \quad (1)$$

$$P_{s_m,asym} \leq \sum_i \prod_{l=1}^{L} r_{sm,ijl}^{-1}, \quad (2)$$

where i includes all the indexes of vectors in $c_i$ that differ in their m-th position from the transmitted vector $c_j$, L being equal to 3 for the PU system and equal to 2 for the SU system.

5. The two-path amplify-and-forward relaying method for a bandwidth efficient cognitive radio according to claim 4, further comprising the step of formulating power constraints on the optimization problem of minimizing a bit error rate (BER) based on the probability of error, the power constraints formulation being characterized by the relation, minimize $f(P_B, \lambda_A, \lambda_B)$ subject to $P_B + \lambda_B P_s \leq P_B$ and $2P_B + \lambda_A P_s + \lambda_B P_s \leq P_{total}$.

6. The two-path amplify-and-forward relaying method for a bandwidth efficient cognitive radio according to claim 5, further comprising the step of using a formulation of the Lagrangian multiplier to find optimal values for $P_B$, $\lambda_A$, $\lambda_B$ wherein, based on the two power constraints, the Lagrangian multiplier formulation is characterized by the relation, $$J(\gamma) = (P_B(i); \lambda_A(i), \lambda_B(i)) = f(P_B(i), \lambda_A(i), \lambda_B(i)) + \Lambda_1(P_B + \lambda_B P_s - \overline{P}_B) + \Lambda_2(2P_B + \lambda_A P_s + \lambda_B P_s - \overline{P}_{total}),$$

where $\Lambda_1$ and $\Lambda_2$ denote the Lagrangian multipliers, and $P_B$, $\lambda_A$, $\lambda_B$ are the SU transmission power and amplifying factors of the two relays $R_A$ and $R_B$, respectively.

7. The two-path amplify-and-forward relaying method for a bandwidth efficient cognitive radio according to claim 6, further comprising the step of performing an adaptive steepest decent algorithm to find the optimal solution in an iterative manner.

8. A computer software product, comprising a non-transitory medium readable by a processor, the non-transitory medium having stored thereon a set of instructions for performing a two-path amplify-and-forward relaying method for a bandwidth efficient cognitive radio, the set of instructions including:

(a) a first sequence of instructions which, when executed by the processor, causes said processor to transmit PU data from a primary user (PU) transmitter S to a primary user (PU) receiver D in cooperation with a first secondary user (SU) relay $R_A$ (SU receiver) and a second secondary user relay $R_B$ (SU transmitter), the PU data transmission being divided into first, second, and third timeslots;

(b) a second sequence of instructions which, when executed by the processor, causes said processor to, in the first timeslot, transmit the algebraic subtraction of two successive modulated signals, $s_1$ and $s_2$ with total power $P_s$ from S to the first secondary user relay $R_A$ and the PU receiver D;

(c) a third sequence of instructions which, when executed by the processor, causes said processor to, in the first timeslot, transmitting data $b_1$ with power $P_B$ from $R_B$ to $R_A$ and the PU receiver D, the data $b_1$ interfering with PU data at $R_A$ and D, the received signal at D and $R_A$ in the $1^{st}$ time slot being characterized by the relations, $$y_D^{(1)} = \sqrt{\frac{P_s}{2}} h_{SD}(s_1 - s_2) + \sqrt{P_B} h_{BD} b_1 + w_D^{(1)},$$

and $$y_A^{(1)} = \sqrt{\frac{P_s}{2}} h_{SA}(s_1 - s_2) + \sqrt{P_B} h_{BA} b_1 + w_A^{(1)};$$

(d) a fourth sequence of instructions which, when executed by the processor, causes said processor to, in the second timeslot, transmit the second symbol only $s_2$ with total power $P_s$ to $R_B$ and D from S, while $R_A$ transmits the previous received data after applying amplify-and-forward (AF) protocol, the second time slot received signals at D and $R_B$ being characterized by the relations, $$y_D^{(2)} = \sqrt{P_s} h_{SD} s_2 + h_{AD} x_A^{(2)} + w_D^{(2)}$$

and $$y_B^{(2)} = \sqrt{P_s} h_{SB} s_2 + h_{AB} x_A^{(2)} + w_B^{(2)},$$

where $w_B$ and $w_A$ are AWGN samples with zero mean and variance $\sigma^2$ and $x_A^{(2)}$ is the amplified received signal at $R_A$ such that $x_A^{(2)} = \beta_A y_A^{(1)}$;

(e) a fifth sequence of instructions which, when executed by the processor, causes said processor to, in the third timeslot, transmit from $R_B$ to $R_A$ and D the received signal after removing the interfered SU data $b_1$ and adding a new fresh version of it but with negative sign $-b_1$ with power $P_B$, the received signal at D and $R_A$ in the third time slot being characterized by the relations, $$y_D^{(3)} = h_{BD} x_B^{(3)} - \sqrt{P_B} h_{BD} b_1 + w_D^{(3)},$$

and $$y_A^{(3)} = h_{BA} x_B^{(3)} - \sqrt{P_B} h_{BA} b_1 + w_A^{(3)},$$

where $x_B^{(3)}$ is the amplified received signal at $R_B$ after the subtraction of the SU data such that $x_B^{(3)} = \beta_B(y_B^{(2)} - b'_1)$, where $b'_1$ is the modified image of SU data $b_1$ such that $b'_1 = \beta_A h_{AB} h_{BA} b_1$;

(f) a sixth sequence of instructions which, when executed by the processor, causes said processor to use a maximum likelihood detector (MLD) in the PU and SU to detect the PU and SU data, wherein the MLD estimates a symbol vector $\hat{x}_s$ that gives the minimum Euclidean distance metric at D and $R_A$, independently, the Euclidean distance metric for D and $R_A$ being characterized by the relations, $$\mu_D = \|y_D = H_D x_S\|^2 = \sum_{l=1}^{L=3} |y_D^{(l)} - h_D^{(l)} x_S|^2,$$

and $$\mu_A = \|y_A = H_A x_S\|^2 = \sum_{l=1}^{L=2} |y_A^{(l)} - h_A^{(l)} x_S|^2,$$

where $h_D^{(l)}$ and $h_A^{(l)}$ denote the l-th row of $H_D$ and $H_A$, respectively, a pairwise-error probability being defined as the probability that the MLD chooses the erroneous data vector $c_i = (c_{i1}, c_{i2}, c_{i3})$ instead of the transmitted data vector $c_j = (c_{j1}, c_{j2}, c_{j3})$, where the data symbols $c_{im}$ and $c_{jm}$ are for the m-th user; and (g) a seventh sequence of instructions which, when executed by the processor, causes said processor to control SU transmission power and amplifying factors of the two relays $R_A$ and $R_B$ based on the pairwise-error probability.

9. The computer software product according to claim 8, further comprising an eighth sequence of instructions which, when executed by the processor, causes said processor to use a Lagrangian multiplier method to minimize the pairwise-error probability, which is characterized by the relations, $$P_{2_{ij}} = \frac{1}{(1-r_{ij})^{2L-1}} \sum_{k=0}^{L-1} \binom{2L-1}{k} (-r_{ij})^k,$$

and $$P_{s_m} \le \Sigma_i P(D_{ij} < 0 | c_j),$$

where $$r_{ij} = \frac{\lambda_{ij1}}{\lambda_{ij2}}$$

is the ratio between the two nonzero eigenvalues of a defined matrix $RF_{ij}$, R being a covariance matrix based on error signals, $F_{ij}$ being a hermitian matrix based on the transmitted data vectors and $D_{ij}$ is the difference between the two metrics of $c_i$ and $c_j$, and i indexes the subset of vectors in $c_i$ which differ in their m-th position from $c_j$.

10. The computer software product according to claim 9, further comprising a ninth sequence of instructions which, when executed by the processor, causes said processor to compute a formulation of a two sided Laplace transform of a probability density function (pdf) of $d_{ijl}$, the formulation being characterized by the relation, $$\phi_{D_{ij}}(s) = \prod_{l=1}^{L} \frac{p_{ijl1} p_{ijl2}}{(s-p_{ijl1})(s-p_{ijl2})},$$

where $$p_{ijl1} = \frac{1}{\lambda_{ijl1}}$$

and $$p_{ijl2} = \frac{1}{\lambda_{ijl2}}$$

as $\lambda_{ijl1}$ and $\lambda_{ijl2}$ are the two non-zero eigenvalues of $R_l$, the inverse Laplace transform of the product being a convolution where $$r_{sm,ijl} = \frac{-p_{ijl2}}{p_{ijl1}},$$

the pairwise error probability of an l-th branch being characterized by the relation, $$P_{sm,ijl} = \frac{1}{(1+r_{sm,ijl})},$$

where $$r_{sm,ijl} = \alpha_{sm,ijl} \Gamma_{sm,jl} \sqrt{(\alpha_{sm,ijl} \Gamma_{sm,jl})^2 + 2(\alpha_{sm,ijl} \Gamma_{sm,jl}) + 1}$$

and where $$\alpha_{sm,ijl} = \frac{\|d_i - d_j x_S\|^2}{2E_{sl}},$$

and $\Gamma_{sm,jl}$ is the average symbol SNR per diversity branch.

11. The computer software product according to claim 10, further comprising a tenth sequence of instructions which, when executed by the processor, causes said processor to compute a formulation of a union bound on the probability of error for the m-th user, the formulation being characterized by the relation selected from the group consisting of, $$P_{sm} \le \sum_i \prod_{l=1}^{L} \frac{1}{(1+r_{sm,ijl})}, \quad (1)$$

$$P_{sm,asym} \le \sum_i \prod_{l=1}^{L} r_{sm,ijl}^{-1}, \quad (2)$$

where i includes all the indexes of vectors in $c_i$ that differ in their m-th position from the transmitted vector $c_j$, L being equal to 3 for the PU system and equal to 2 for the SU system.

12. The computer software product according to claim 11, further comprising an eleventh sequence of instructions which, when executed by the processor, causes said processor to formulate power constraints on the optimization problem of minimizing a bit error rate (BER) based on the probability of error, the power constraints formulation being characterized by the relation, $$\text{minimize } f(P_B, \lambda_A, \lambda_B)$$
$$\text{subject to } P_B + \lambda_B P_s \leq P_B \text{ and } 2P_B + \lambda_A P_s + \lambda_B P_s \leq P_{total}.$$

13. The computer software product according to claim 12, further comprising a twelfth sequence of instructions which, when executed by the processor, causes said processor to use a formulation of the Lagrangian multiplier to find optimal values for $P_B, \lambda_A, \lambda_B$ wherein, based on the two power constraints, the Lagrangian multiplier formulation is characterized by the relation, $$J(\gamma) = (P_B(i); \lambda_A(i), \lambda_B(i)) = f(P_B(i), \lambda_A(i), \lambda_B(i)) + \Lambda_1 (P_B + \lambda_B P_s - \overline{P}_B) + \Lambda_2 (2P_B + \lambda_A P_s + \lambda_B P_s - \overline{P}_{total}),$$

where $\Lambda_1$ and $\Lambda_2$ denote the Lagrangian multipliers, and $P_B$, $\lambda_A$, $\lambda_B$ are the SU transmission power and amplifying factors of the two relays $R_A$ and $R_B$, respectively.

14. The computer software product according to claim 13, further comprising a thirteenth sequence of instructions which, when executed by the processor, causes said processor to perform an adaptive steepest decent algorithm to find the optimal solution in an iterative manner.

* * * * *